(12) United States Patent
Sherkin et al.

(10) Patent No.: US 8,566,577 B2
(45) Date of Patent: Oct. 22, 2013

(54) METHOD AND DEVICE FOR STORING SECURED SENT MESSAGE DATA

(75) Inventors: Alexander Sherkin, North York (CA); Ravi Singh, Waterloo (CA); Neil Patrick Adams, Kitchener (CA); Nikhil Vats, Vaughan (CA)

(73) Assignee: Blackberry Limited, Waterloo (CA)

( * ) Notice: Subject to any disclaimer, the term of this patent is extended or adjusted under 35 U.S.C. 154(b) by 261 days.

(21) Appl. No.: 12/956,047

(22) Filed: Nov. 30, 2010

(65) Prior Publication Data

US 2012/0137121 A1    May 31, 2012

(51) Int. Cl.
*H04L 29/06* (2006.01)
*G06F 15/16* (2006.01)
*G06F 17/00* (2006.01)
*G06Q 10/10* (2012.01)

(52) U.S. Cl.
CPC .......... *H04L 63/0428* (2013.01); *G06Q 10/107* (2013.01)
USPC ............................. 713/150; 709/206; 726/1

(58) Field of Classification Search
USPC ............................. 709/206; 713/150; 726/1
See application file for complete search history.

(56) References Cited

U.S. PATENT DOCUMENTS

| | | | |
|---|---|---|---|
| 6,044,395 A * | 3/2000 | Costales et al. .............. | 709/206 |
| 6,563,913 B1 * | 5/2003 | Kaghazian ................ | 379/93.24 |
| 7,243,163 B1 * | 7/2007 | Friend et al. .................. | 709/248 |
| 7,574,479 B2 * | 8/2009 | Morris et al. ................. | 709/207 |
| 8,150,923 B2 * | 4/2012 | Vaschillo et al. ............. | 709/206 |
| 2004/0034688 A1 | 2/2004 | Dunn | |
| 2004/0186894 A1 | 9/2004 | Jhingan et al. | |
| 2005/0080861 A1 * | 4/2005 | Daniell et al. ................ | 709/206 |
| 2005/0102361 A1 * | 5/2005 | Winjum et al. ............... | 709/206 |
| 2005/0160149 A1 * | 7/2005 | Durand et al. ................ | 709/206 |
| 2005/0174975 A1 * | 8/2005 | Mgrdechian et al. ......... | 370/338 |
| 2005/0221797 A1 * | 10/2005 | Howard ....................... | 455/411 |

(Continued)

FOREIGN PATENT DOCUMENTS

WO    2009/064288    5/2009

OTHER PUBLICATIONS

European Search Report dated May 4, 2001 for corresponding European Patent Application No. 10193062.6.

(Continued)

*Primary Examiner* — Andrew L. Nalven
*Assistant Examiner* — Walter Malinowski
(74) *Attorney, Agent, or Firm* — Ridout & Maybee LLP

(57) ABSTRACT

Methods and devices for storing sent message data are described. The sent message data corresponds to a message sent to a destination by a communication device via a server. The method includes compiling a first portion of the message which has a plurality of components; applying security encoding to the first portion; and storing the first portion. The first portion includes at least one but not all of the plurality of components in the message, and pointers to the components not included in the first portion.

14 Claims, 5 Drawing Sheets

(56) References Cited

U.S. PATENT DOCUMENTS

| | | | |
|---|---|---|---|
| 2007/0100843 A1* | 5/2007 | Chen et al. | 707/100 |
| 2007/0168429 A1* | 7/2007 | Apfel et al. | 709/206 |
| 2008/0031458 A1* | 2/2008 | Raja | 380/279 |
| 2009/0061912 A1* | 3/2009 | Brown et al. | 455/466 |
| 2009/0228564 A1* | 9/2009 | Hamburg | 709/206 |
| 2010/0011075 A1* | 1/2010 | Klassen et al. | 709/206 |
| 2010/0106788 A1* | 4/2010 | Lynn et al. | 709/206 |
| 2010/0125637 A1* | 5/2010 | Gonda et al. | 709/206 |
| 2010/0306320 A1* | 12/2010 | Leppanen et al. | 709/206 |
| 2011/0191433 A1* | 8/2011 | Du | 709/206 |
| 2012/0110097 A1* | 5/2012 | Singh et al. | 709/206 |
| 2012/0278620 A1* | 11/2012 | Singh et al. | 709/206 |

OTHER PUBLICATIONS

Ramsdell, B. and Turner, S.; "Secure/Multipurpose Internet Mail Extensions (S/MIME) Version 3.2 Message Specification", IETF RFC 5751, Jan. 2010.

* cited by examiner

METHOD AND DEVICE FOR STORING SECURED SENT MESSAGE DATA

TECHNICAL FIELD

The present disclosure relates to the field of secure messaging, and more specifically to the field of secure messaging on communication devices.

BACKGROUND

Messaging applications often store copies of messages sent from a communication device which can be later referenced, resent or forwarded to other recipients. Additionally, these messages may be secured by digitally signing, encrypting the messages or both.

Storing secure copies of all sent messages, which may include large attachments or repetitious data, can require a significant amount of capacity on communication devices with limited storage. Accordingly, it may be desirable to provide an improved approach to storing secured messages.

BRIEF DESCRIPTION OF THE DRAWINGS

Embodiments will now be described, by way of example only, with reference to the attached figures, wherein.

DETAILED DESCRIPTION OF EXAMPLE EMBODIMENTS

Figure 1:
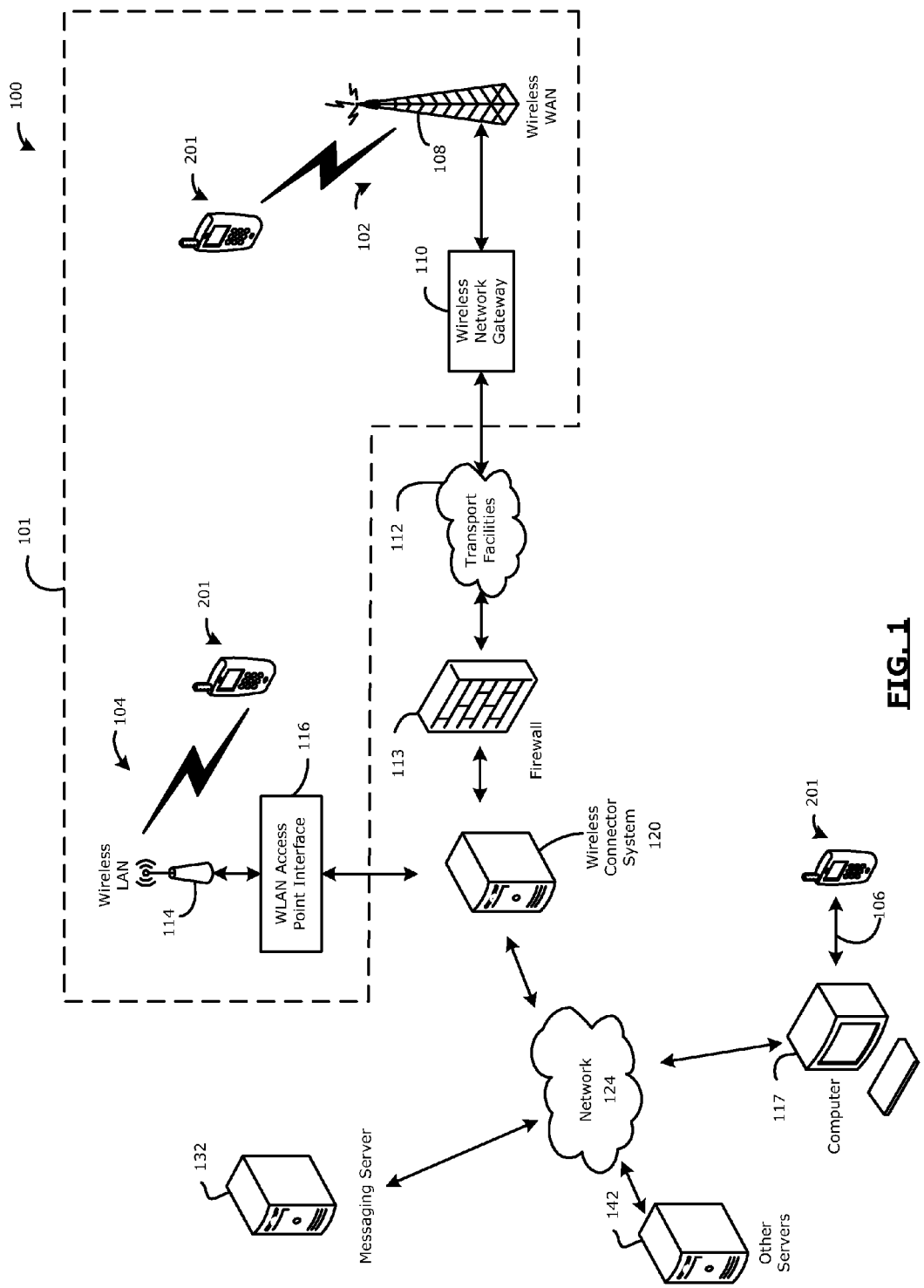
FIG. 1 is a block diagram of a communications system to which embodiments may be applied.

In accordance with one aspect, there is provided a method of storing sent message data on a communication device. The sent message data corresponds to a message sent to a destination by the communication device via a server. The method includes compiling a first portion of the message which has a plurality of components; applying security encoding to the first portion; and storing the first portion. The first portion includes at least one but not all of the plurality of components in the message, and pointers to the components not included in the first portion.

In another aspect, the present application discloses a communication device. The communication device includes a processor; and memory. The processor is configured to compile a first portion of a message being sent to a destination via a server, the message including a plurality of components, wherein the first portion includes at least one but not all of the plurality of components in the message and pointers to the components not included in the first portion; apply security encoding to the first portion; and store the first portion in the memory.

In another aspect, the present application describes a method of verifying secured sent message data on a communication device. The method includes compiling a message from a first portion and determining whether a signature matches the message. The message includes a plurality of components, wherein the first portion includes at least one but not all of the plurality of components, and pointers to the components not included in the first portion, and wherein compiling the message includes retrieving the components not included in the first portion using the pointers, and combining the components included in the first portion with the retrieved components.

In yet a further aspect, the present application describes a communication device that includes a processor, a memory, and an application stored in memory and containing computer-executable instructions that, when executed by the processor, configure the processor to verify secured sent message data. The computer-executable instructions configure the processor to compile a message from a first portion and determine whether a signature matches the message. The message includes a plurality of components, wherein the first portion includes at least one but not all of the plurality of components, and pointers to the components not included in the first portion, and wherein compiling the message includes retrieving the components not included in the first portion using the pointers, and combining the components included in the first portion with the retrieved components.

Messaging applications, such as an email client, are typically used to manage a user's messages and to facilitate the sending and receiving of messages via a messaging server. Incoming messages are generally received at and stored on the server, and the messaging application connects to the server to access or download the incoming messages. In some systems, incoming messages received at the server are pushed to the communication device. Outgoing messages are generally composed on the communication device and are sent to the server where they may be stored before being sent on to the destination. Both incoming and outgoing message may include text and attached data or file attachments such as images, documents, presentation files and other user data.

In the following description, the term "message" is to be understood to include both the text and any attachments or attached data. Also, while some of the following examples are discussed in the context of email messaging, the present disclosure is not necessarily limited to email messages and may be applicable more broadly to any messaging system wherein messages are sent from a communication device to a remote destination via a server.

Most messaging applications allow a user to reply to an incoming message or forward an incoming message to another destination. In additional to any new text or attachments provided by a user, these forwarded or reply messages may include the text of the original incoming message and/or any attachments in the original incoming messages.

In some messaging applications, messages may be digitally signed to provide sender authentication, message integrity, or non-repudiation. A digital signature may be generated by the message sender by applying the sender's private cryptographic key and a cryptographic algorithm to the message. Upon receipt, the recipient may verify the digital signature using the sender's public cryptographic key, and compare it to the message. Since the digital signature can only be produced by the sender's private cryptographic key, the recipient may be reassured of the sender's authenticity, the message integrity, or may use the signature to prevent repudiation of the message.

In some examples, a hash or message digest may be generated from the message before applying the cryptographic algorithm. Generating or verifying a signature for the shortened hash is generally less computationally intensive than it is for the entire message. In the following description, the phrase "generating a signature" or similar language contemplates both the scenario where a signature is generated from the hash of a message, and the scenario where a signature is generated from the message itself.

The digital signature may be generated using any algorithm including but not limited to the Digital Signature Algorithm (DSA); Elliptic Curve DSA; and the Rivest, Shamir, Adleman (RSA) algorithm. For further security, the sender may use a third-party certificate authority to certify ownership of the public key associated with the digital signature.

In some examples, instead of or in addition to being signed, the message may be encrypted by the sender to prevent unauthorized access to the message. For example, the message may be encrypted using an encryption key and an encryption scheme such as Advanced Encryption Standard (AES) or Triple Data Encryption Standard (Triple DES).

In accordance with one aspect of the present disclosure, in some messaging systems, portions of a message to be sent to a destination may be stored on the server and may or may not be stored on the communication device. In these systems, when the communication device replies to or forwards a message for which portions are stored on the server, the communication device may reduce data transmission costs by only sending the portions of the message which are not stored on the server. In some examples, the communication device may not be required to store or to even have received the portions stored on the server.

When sending a message, the communication device may be configured to store a local copy of the sent message for future reference or to allow the message to be resent or forwarded to another recipient. A digitally signed or encrypted message may be stored to provide a verifiable future reference for a message that was sent to a recipient. The stored message may also provide information regarding how the message was secured including, for example, whether the message was signed, encrypted, or both signed and encrypted. The message may also provide information about the method used to secure the message such as Secure/Multipurpose Internet Mail Extensions (S/MIME) or Pretty Good Privacy (PGP).

In some examples, the communication device may be configured to store only a portion of a sent message. By not saving the entire sent message, the size of the saved sent message data may be reduced, and the saving of duplicate attachments or message data may be avoided.

In the following description, many of the described embodiments involve communication devices communicating with a server over a wireless network. However, the present disclosure is not necessarily limited to wireless communications and may be applicable more broadly to any communications device configured to send messages to a remote destination via a server.

Reference is made to FIG. 1, which shows, in block diagram form, an example communication system 100. The communication system 100 includes a number of communication devices 201, which may be connected to the remainder of system 100 in any of several different ways. For illustrative purposes, two instances of communication devices 201 are depicted in FIG. 1 each employing different example ways of connecting to system 100. Communication devices 201 are connected to a wireless communication network 101, which may comprise one or more of a Wireless Wide Area Network (WWAN) 102, a Wireless Local Area Network (WLAN) 104, or any other suitable network arrangements. In some embodiments, the communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of base stations 108 (one of which is shown in FIG. 1), each containing radio transmitting and receiving equipment adapted to provide wireless radio-frequency (RF) network service or "coverage" to a corresponding area or cell. The WWAN 102 is typically operated by a mobile network service provider that provides subscription packages to users of the mobile communication devices 201. The WWAN 102 may be implemented as any appropriate wireless network, including, but not limited to, any to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"). Other network types and technologies could also be used. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

A wireless network gateway 110 may be associated with the WWAN 102 to connect the communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the Internet rather than an internal or enterprise network.

The wireless network gateway 110 provides an interface between the wireless connector system 120 and the WWAN 102, which facilitates communication between the communication devices 201 and other devices (not shown) connected, directly or indirectly, to the WWAN 102. Accordingly, communications sent via the communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the communication devices 201.

The WLAN 104 comprises a wireless network which, in some embodiments, conforms to IEEE 802.11x standards (sometimes referred to as Wi-Fi) such as, for example, any or all of the IEEE 802.11a, 802.11b, 802.11g, or 802.11n standards. Other communication protocols may be used for the WLAN 104 in other embodiments such as, for example, IEEE 802.16e (also referred to as Worldwide Interoperability for Microwave Access or "WIMAX"), or IEEE 802.20 (also referred to as Mobile Wireless Broadband Access). The WLAN 104 includes one or more wireless RF Access Points (AP) 114 (one of which is shown in FIG. 1) that collectively provide WLAN service or coverage over an area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116, which may connect to the wireless connector system 120 directly (for example, if the access point 114 is part of an enterprise WLAN 104 in which the wireless connector system 120 resides), or indirectly (not shown) via the transport facilities 112 if the access point 14 is a personal Wi-Fi network or Wi-Fi hotspot (in which case, a mechanism for securely connecting to the wireless connector system 120, such as a virtual private network (VPN), may be desirable). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including e-mail messages, to and from a set of managed communication devices 201. The wireless connector system 120 also provides administrative control and management capabilities over users and communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) or other servers 142. In the context of the present disclosure, the term other server 142 encompasses both content servers for providing content such as internet content or content from an organization's internal servers, as well as servers for implementing server-based applications such as instant messaging (IM) applications.

In FIG. 1, the messaging server 132 and other servers 142 appear separately from the wireless connector system 120; however, in other examples, the messaging server 132 or other servers 142 may be at the same location as the wireless connector system 120.

The wireless connector system 120 typically provides a secure exchange of data (e.g., e-mail messages, personal information manager (PIM) data, and IM data) with the communication devices 201. In some embodiments, communications between the wireless connector system 120 and the communication devices 201 are encrypted.

The wireless network gateway 110 is adapted to send data packets received from the communication device 201 over the WWAN 102 to the wireless connector system 120. The wireless connector system 120 then sends the data packets to the appropriate connection via a proxy server, or directly to a server such as a messaging 132 or other 142 server. Conversely, the wireless connector system 120 sends data packets received, for example, from a server 132, 142 to the wireless network gateway 110 which then transmits the data packets to the destination communication device 201. The AP interfaces 116 of the WLAN 104 provide similar sending functions between the communication device 201, the wireless connector system 120 and network connection point such as the messaging 132 or other servers 142.

The messaging 132 or other servers 142 may be configured to receive messages from a communication device 201 and send them to the proper destination via the network 124. In some examples, the server 132, 142 may receive a first portion of the message from the communication device 201 and combine it with the second portion of the message stored on the server 132, 142 before sending the combined message to its destination.

The network 124 may comprise a private local area network, metropolitan area network, wide area network, the public internet or combinations thereof and may include virtual networks constructed using any of these, alone, or in combination. A communication device 201 may alternatively connect to the wireless connector system 120 using a computer 117, such as desktop or notebook computer, via the network 124. A link 106 may be provided for exchanging information between the communication device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the communication device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as Ultra-Wideband (UWB), or other PAN connection.

It will be appreciated that the above-described communication system 100 is provided for the purpose of illustration only, and that the above-described communication system 100 comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system are intended to fall within the scope of the present disclosure.

Figure 2:
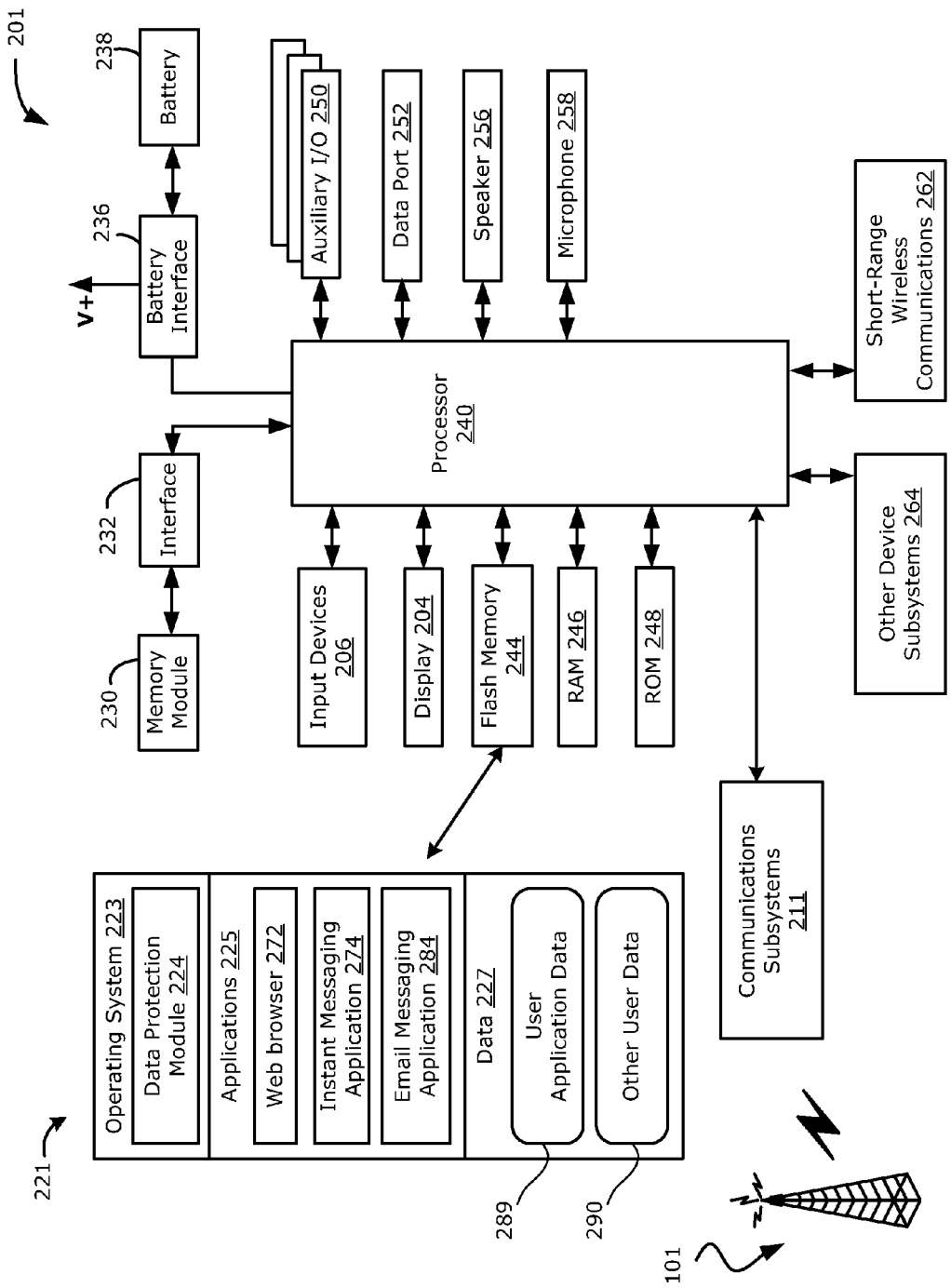
FIG. 2 is a block diagram showing an example of a communication device that can be used in the communications system of FIG. 1.

Reference is now made to FIG. 2 which illustrates a communication device 201 in which example embodiments described in the present disclosure can be applied. The communication device 201 is a two-way communication device having data and voice communication capabilities, and the capability to communicate with other computer systems, for example, via the Internet. Depending on the functionality provided by the communication device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The communication device 201 includes a rigid case (not shown) housing the components of the device 201. The internal components of the device 201 are constructed on a printed circuit board (PCB). The communication device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication device 201 may communicate with any one of a plurality of fixed transceiver base stations 108 (FIG. 1) of the wireless network 101 within its geographic coverage area. The communication device 201 may send and receive communication signals over the wireless network 101 after the required network registration or activation procedures have been completed.

The processor 240 operates under stored program control and executes software modules 221 stored in memory such as persistent memory, for example, in the flash memory 244. As illustrated in FIG. 2, the software modules 221 comprise operating system software 223 and software applications 225, which may include a web browser 272, an instant messaging application 274, and an email messaging application 284. In some example embodiments, the functions performed by each of the applications 272, 274, and 284 may each be realized as a plurality of independent elements, and any one or more of these elements may be implemented as parts of other software applications 225. In some examples, one or more applications 225 are configured to send messages to a user defined destination via a messaging 132 or other server 142.

In some examples, the software modules 221 may be configured to send messages to a destination when one portion of the message is on the communication device 201 and another portion is on a server 132, 142. In some examples, the software modules 221 may be configured to encrypt or digitally sign messages or portions of messages.

In some examples, the software modules 221 may include a data protection module 224 which configures the processor 240 to protect data, such as message components, stored in the flash memory 244 or on the memory module 230. This may involve, for example, encryption, password protection, read-only protection, or any other file access related protection mechanisms. In some examples, the data protection module may be part of the file system or operating system 223 as illustrated in FIG. 2. Although the data protection module 224 is illustrated as a separate module in FIG. 2, in some examples, the data protection module may be realized as a plurality of independent elements, and any one or more of these elements may be implemented as parts of other software modules 221 in the operating system 223, software applications 225 or otherwise.

The software modules 221 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

In some embodiments, the auxiliary input/output (I/O) subsystems 250 may comprise an external communication link or interface, for example, an Ethernet connection. The communication device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the communication device 201 also includes a removable memory card 230 (typically comprising flash memory) and a memory card interface 232. Network access typically associated with a subscriber or user of the communication device 201 via the memory card 230, which may be a Subscriber Identity Module (SIM) card for use in a GSM network or other type of memory card for use in the relevant wireless network type. The memory card 230 is inserted in or connected to the memory card interface 232 of the communication device 201 in order to operate in conjunction with the wireless network 101.

The communication device 201 also stores other data 227 in an erasable persistent memory, which in one example embodiment is the flash memory 244. In various embodiments, the data 227 includes service data comprising information required by the communication device 201 to establish and maintain communication with the wireless network 101. The data 227 may also include user application data 289 such as email messages, address book and contact information, calendar and schedule information, notepad documents, image files, and other commonly stored user information stored on the communication device 201 by its user, and other data 290. The data 227 stored in the persistent memory (e.g. flash memory 244) of the communication device 201 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the communication device 201 by providing for information or software downloads to the communication device 201 other than through the wireless network 101. The alternate download path may, for example, be used to load an encryption key onto the communication device 201 through a direct, reliable and trusted connection to thereby provide secure device communication.

In some embodiments, the communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their communication device 201 to the host computer system via a USB cable or Bluetooth® connection, traffic that was destined for the wireless network 101 is automatically routed to the communication device 201 using the USB cable or Bluetooth® connection. Similarly, any traffic destined for the wireless network 101 is automatically sent over the USB cable Bluetooth® connection to the host computer system for processing.

The communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the communication device 201, and the battery interface 236 provides a mechanical and electrical connection for the battery 238. The battery interface 236 is coupled to a regulator (not shown) which provides power V+ to the circuitry of the communication device 201.

The short-range communication subsystem 262 is an additional optional component which provides for communication between the communication device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the communication device 201 during or after manufacture. Additional applications and/or upgrades to the operating system 223 or software applications 225 may also be loaded onto the communication device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the communication device 201 and may provide enhanced on-device functions, communication-related functions, or both. For example, secure communication applications may enable electronic commerce functions and other such financial transactions to be performed using the communication device 201.

The communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the communication device 201 may also compose data items, such as email messages, for example, using the input devices in conjunction with the display screen 204. These composed items may be transmitted through the communication subsystem 211 over the wireless network 101.

In the voice communication mode, the communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the communication device 201. Although voice or audio signal output is typically accomplished primarily through the speaker 256, the display screen 204 may also be used to provide an indication of the identity of a calling party, duration of a voice call, or other voice call related information.

Figure 3:
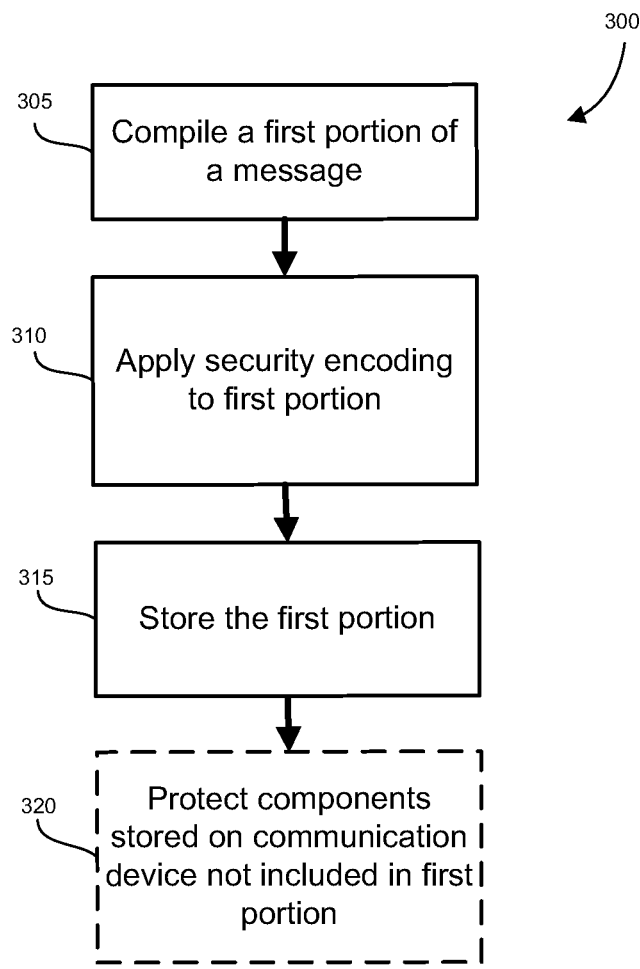
FIG. 3 shows, in flowchart form, an example method of storing secured message data.

Reference is now made to FIG. 3, which shows, in flowchart form, a method 300 of storing secured message data. In this example, a message is sent from a communication device to a destination. The message includes a number of components including but not limited to text and attachments. In some examples, one or more of the components in the message are on the communication device and some of the components may be stored on a server.

For illustrative purposes, FIG. 3 will be discussed in the context of an example scenario, wherein the message being sent from the communication device is a forward of an original email. The original email consists of an image attachment and a text description both of which are stored on a messaging server. The message contains text comments and a portable document format (PDF) file attachment which are on the communication device, as well as the original email's text and the original email's image attachment.

At event 305, a first portion of the message is compiled. The first portion may include one or more but not all of the message components, and pointers to the components not included in the first portion.

In some examples, the pointers may be attachment headers. An attachment header is attachment metadata that does not include the actual attachment payload. In some examples, attachment headers include the attachment name, size and pointers to the attachment payload location.

In other examples, the pointers may include filenames and the full file system or network paths to the components. In yet other examples, the pointers may point to messaging database records or entries corresponding to the components. The pointers may point to components stored locally on the communication device, or components stored remotely on the server.

In some examples, if a component is stored both on the communication device and on the server, the first portion may include a pointer to the location of the component on the communication device or to the location of the component on the server. In some of these examples, the first portion may include multiple pointers to the same component: a first pointer to the location of the component on the communication device, and a second pointer to the location of the same component on the server.

In some examples, if a component stored locally on the communication device is to be sent to the server as part of a message, the pointer may point to a location where the component is to be stored on the server. In some of these examples, two pointers may be compiled for the same component, a first pointer pointing to the location of the component on the communication device and a second pointer pointing to location where the same component is to be stored on the server.

In the present description the term "pointer" is intended to include references such as explicit addresses or path names, and less explicit references, including non-address-specific references to a file, object, or item. For example, a pointer may explicitly indicate a file name and path for locating a specific attachment within the directory structure of the memory of the communication device. In another example, a pointer may be a reference to a file name or item, including an original email or text, without an explicit path or address. In one example, the device may generate and include a unique identifier or number for the file or item in the pointer, which may enable the server to locate its copy of the file or item based on correlation with the unique identifier or number. In the examples described herein, "pointers" may include any such examples or other types of references to components of the message.

In one example, the first portion may only include the new text component of the message. Text components may be plain text, rich text, HyperText Markup Language (HTML), Extensible Markup Language (XML), or any other text-based message component. For example, in the described scenario, only the text comments on the communication device are compiled as part of the first portion, while the PDF attachment and the original email's text and image attachment are excluded. The communication device may compile pointers to the PDF attachment, the original email's text, and the original email's image attachment as part of the first portion.

In another example, the first portion may only include components that are on the communication device. For example, in the described scenario, the text comments and PDF attachment are compiled as part of the first portion, while the original email's text and image attachment are excluded. The communication device may include pointers to the original email's text and image attachment as part of the first portion.

Notwithstanding the above examples, the communication device may compile any subset of the message components as part of the first portion.

At event 310, the communication device applies security encoding to the first portion of the message. Applying security encoding to the first portion may include digitally signing the first portion, encrypting the first portion or both signing and encrypting the first portion. In some embodiments, the security encoding applied to the first portion is based upon the security encoding applied to the message. For example, if the communication device is configured to apply a certain security encoding to the message, or if the server is configured to apply a certain security encoding to the message, then the security encoding applied to the first portion may be the same type of security encoding applied to the complete message. In this manner the security encoding applied to the first portion saved on the communication device is indicative of the security encoding applied to the message sent to the destination.

In one embodiment, to apply security encoding by digitally signing the first portion, the communication device generates a digital signature for the first portion of the message. The signature for the first portion may be generated using any cryptographic algorithm as discussed above. In some examples, the signature may be generated using standard message security mechanisms PGP or S/MIME.

In some examples, the pointers are not included with the first portion for the purposes of generating the digital signature. In other examples, the pointers are included with the first portion when generating the digital signature. Including the pointers with the first portion affords the pointers the security applied to the first portion.

In some example embodiments, to apply security encoding by encrypting the first portion, the communication device may encrypt the first portion using an encryption key and any encryption scheme such as AES or Triple DES.

In yet other example embodiments, the communication device may apply security encoding by both encrypting and signing the first portion.

At event 315, the secured first portion including any pointers to components not in the first portion is stored on the communication device. If the first portion was digitally signed at event 310, the signature for the first portion is also stored on the communication device. If the first portion was encrypted at event 310, the encrypted first portion is stored on the device. The encryption key used to encrypt the first portion may also be stored on the communication device in some embodiments. In yet other embodiments, in which the communication device is capable of re-generating the encryption key, the encryption key may not be stored on the communication device.

At event 320, the communication device may optionally protect the message components stored on the communication device that were not included in the first portion. These components may be protected by the data protection module 224, for example, by encrypting the components, by marking the components as read only, by password protecting the components or by any other mechanism that prevents access or modification to the components.

In some examples, when the data protection module 224 is configured to protect all data and files on the communication device, the message components stored on the communication device but not included in the first portion may be automatically protected by the data protection module 224.

In other examples, the data protection module 224 may be configured to only protect message components stored on the communication device not in the first portion, and to leave all other files and data unprotected.

In other examples, the data protection module 224 may be configured to protect message components stored on the communication device not in the first portion using a different protection mechanism from the protection mechanism used for all other files and data on the communication device.

In some examples, the data protection module 224 may encrypt a message component not in the first portion with a first encryption key. The first encryption key may then be included in the first portion and encrypted when the first portion is encrypted. If the same component is subsequently part of a second message, the first encryption key may be included in the first portion of the second message and thus is encrypted with the first portion of the second message, such that a duplicate copy of the encrypted component is not created.

Figure 4:
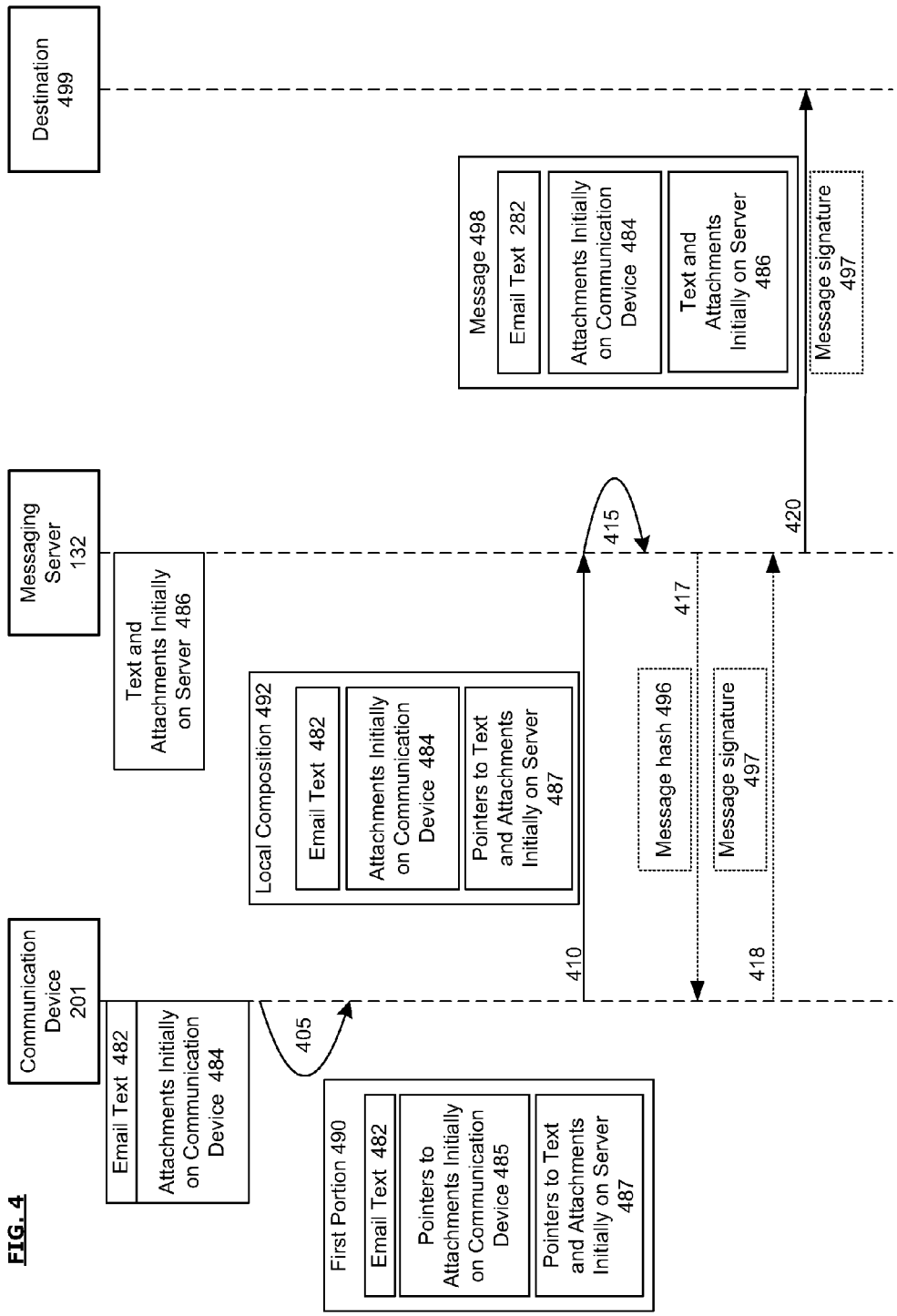
FIGS. 4 and 5 are flowcharts illustrating a communication between a communication device, a messaging server and a destination; and Like reference numerals are used throughout the figures to denote similar elements and features.

FIG. 4 shows an example signalling diagram illustrating communications between a communication device 201 and a messaging server 132 in accordance with one aspect of the present disclosure. In this example, the communication device 201 is running an email messaging application 284, and the user of the communication device 201 is using the email messaging application 284 to send an email message to a destination 499. The complete email message consists of email text 482 and attachments 484 initially stored on the communication device 201, and text and attachments 486 initially stored on the messaging server 132.

At event 405, the communication device compiles, applies security encoding to and stores a first portion 490 of the email on the communication device. The first portion 490 includes the email text 482, as well as pointers 485 to the attachments initially stored on the communication device and pointers 487 to the text and attachments initially stored on the server.

Since copies of the local attachments are not stored with the first portion 490, to ensure the integrity of the local attachments, the communication device 201 may be configured by the data protection module 224 to protect the attachments 484 initially stored on the communication device.

In some examples, the data protection module 224 may be configured to protect the attachments initially stored on the communication device 484 by one of the example mechanisms described above.

At event 410, the communication device sends a local composition 492 of the email to the messaging server 132. The local composition 492 includes the email text 482, the attachments 484 initially stored on the communication device, and pointers to the text and attachments 487 initially stored on the server.

At event 415, the messaging server 132 compiles the message by combining the email text 482 and attachments 484 initially stored on the communication device received in the local composition 492 with the remote text and attachments 486 stored on the messaging server 132. The messaging server may store a copy of the email text 482 and the attachments 484 initially on the communication device. In some examples, the messaging server may encrypt or sign the compiled message 498.

At event 420, the message 498 is sent to the destination 499.

In some examples, before sending the message to the destination 499, the messaging server 132 may, at optional event 417, generate and send a hash 496 for the message to the communication device 201. The communication device 201, at optional event 418, signs the hash 496 and sends the resulting message signature 497 to the messaging server 132. The communication device may store the signature 497 for the message with the first portion 490, and the messaging server may send the signature 497 to the destination 499 with the message 498.

As described above, the pointers 485 to the attachments initially stored on the communication device may point to their location on the communication device 201, to the copy on the messaging server 132 after the messaging server 132 receives the attachments 484 in the local composition 492, or to both locations. In one embodiment, the pointer to the attachments on the messaging server may include a unique identifier or ID code generated by the communication device 201 in order to facilitate later identification of the attachments at the server. The server may store the received attachments in association with their respective unique identifiers.

Figure 5:
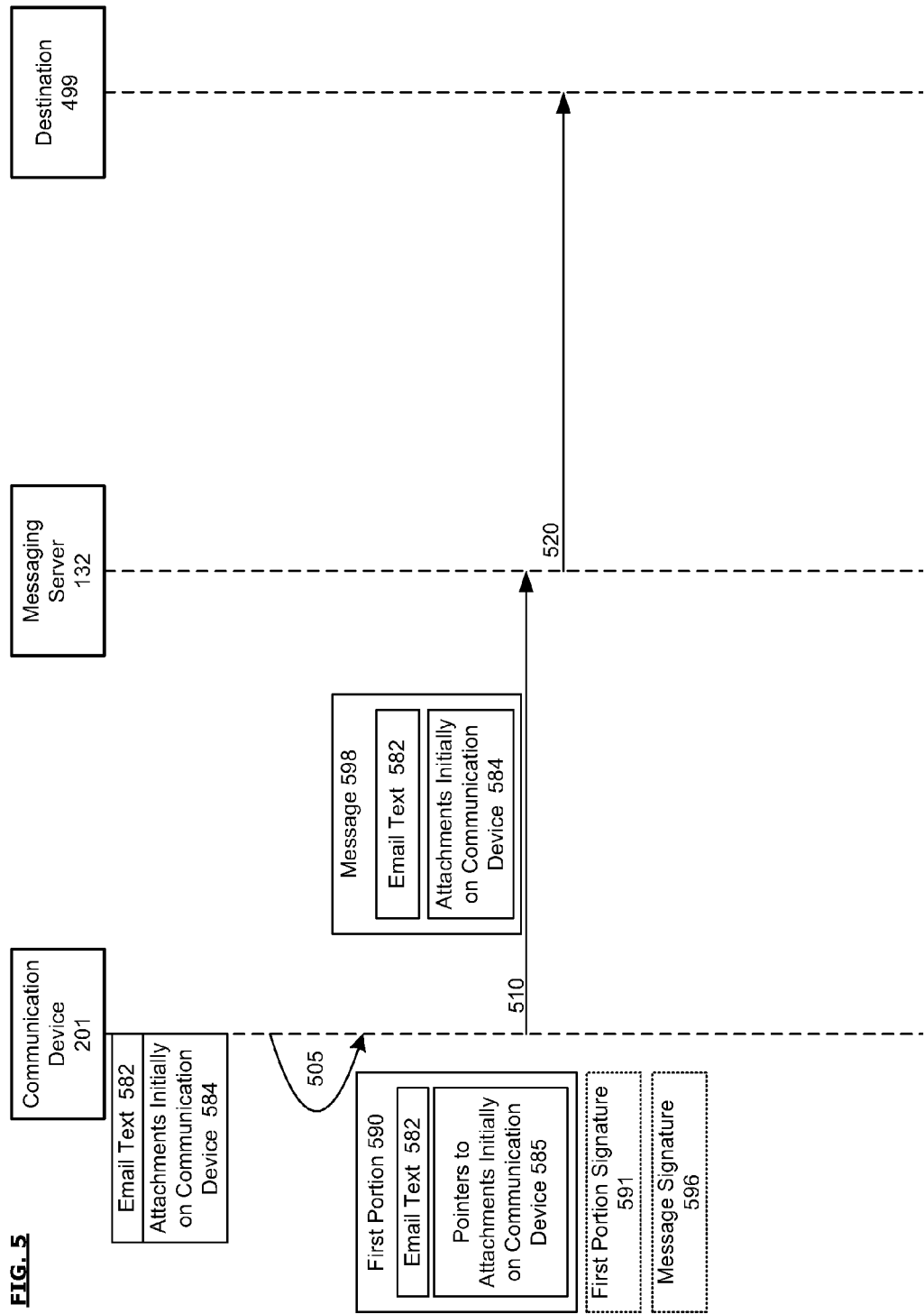

FIG. 5 shows another example signalling diagram illustrating communications between a communication device 201 and a messaging server 132. In this example, the complete email message consists of email text 582 and attachments 584 both initially stored on the communication device 201.

At event 505, the communication device compiles, applies securing encoding to and stores a first portion 590 of the email on the communication device. The first portion 590 includes the email text 582, and pointers to the attachments 585 initially stored on the communication device. If the communication device applies security encoding by signing the first portion, the signature 591 may be stored with the first portion 590.

At event 510, the communication device may apply security encoding to the entire message and sends the message 598 to the messaging server 132. If the communication device applies security encoding by signing the entire message, the communication device may store a copy of the signature 596 for the entire message with the first portion 590.

At event 520, the messaging server 132 forwards the message 598 received from the communication device 201 on to the destination 499. The messaging server 132 may store a copy of the attachments 584 initially stored on the communication device.

In some examples, the communication device 201 may be configured by the data protection module 224 to protect the local attachments 584 in any of the manners as described above.

As described above, the pointers 585 to the attachments initially stored on the communication device may point to their location on the communication device 201, to the copy that will be stored on the messaging server 132 after the messaging server 132 receives the attachments 584 in the message 598, or to both locations.

In any of the above examples in which the first portion is signed, the first portion can be directly verified against the signature for the first portion by using the verification algorithm corresponding to the algorithm used to generate the signature. In some examples, this includes verifying the signature for the first portion and comparing it either directly to the first portion or to a hash of the first portion.

In the examples above in which the communication device is configured to store the first portion and the complete message signature, in order to verify on the communication device that the complete message matches the complete message signature, the communication device may be configured to compile the complete message before the comparison can be performed.

To compile the message, the communication device may be configured to retrieve the components not included in the first portion using the pointers stored with the first portion. In some examples, the pointers may point to components stored on the communication device which may have to be decrypted before they can be accessed. In some examples, the pointers may point to components stored on a server which may have to be requested and downloaded onto the communication device.

After retrieving all the components, the communication device may combine the components to form the complete message which can be verified against the signature.

The above-described embodiments of the present disclosure are intended to be examples only. Alterations, modifications and variations may be effected to the particular embodiments by those skilled in the art having the benefit of the present disclosure without departing from the scope of the disclosure, which is defined by the claims appended hereto. The subject matter described herein and in the recited claims intends to cover and embrace all suitable changes in technology.

The invention claimed is:

1. A method of storing sent message data on a communication device, the sent message data corresponding to a message sent to a destination by the communication device via a server, the method comprising:
    compiling a first portion of the message, the message including a plurality of components,
        wherein the first portion includes
            at least one but not all of the plurality of components in the message, and
            pointers to the components not included in the first portion,
        wherein one of the plurality of components is a component stored on the communication device and is not included in the first portion, a pointer for the component stored on the communication device is included in the first portion, and the pointer points to a location where the component is stored on the communication device;

applying security encoding to the first portion;

storing the first portion; and enabling a content protection mechanism for the component stored on the communication device.

2. The method of claim 1 wherein when one of the plurality of components of the message is a component stored on the server, the component stored on the server is not included in the first portion, and a pointer for the component stored on the server is included in the first portion, and the pointer points to a location where the component is stored on the server.

3. The method of claim 1 wherein enabling the content protection mechanism comprises:

encrypting the component stored on the communication device with a first encryption key; and including the first encryption key in the first portion;

wherein applying security encoding to the first portion includes encrypting the first portion.

4. The method of claim 1 wherein one of the plurality of components is a component stored on both the communication device and the server and that component is not included in the first portion, a first pointer and a second pointer are included in the first portion, the first pointer points to a location where the component is stored on the communication device, and the second pointer points to a location where the component is stored on the server.

5. The method of claim 1 wherein applying the security encoding to the first portion comprises generating a signature for the first portion, and wherein storing the first portion includes storing the signature for the first portion.

6. The method of claim 1 wherein applying the security encoding to the first portion comprises encrypting the first portion to produce an encrypted first portion, and storing the first portion comprises storing the encrypted first portion.

7. The method of claim 1 wherein the plurality of components of the message include components stored on the communication device and components stored on the server, the method further comprising:

compiling a local composition of the message, the local composition including the components stored on the communication device and pointers to the components stored on the server; and sending the local composition to the server.

8. A communication device comprising:

a processor; and memory;

an application stored in memory and containing computer-executable instructions that, when executed by the processor, configure the processor to store sent message data relating to a message sent to a destination by the communication device via a server, and wherein the computer-executable instructions configure the processor to compile a first portion of the message, the message including a plurality of components, wherein the first portion includes at least one but not all of the plurality of components in the message, and pointers to the components not included in the first portion, wherein one of the plurality of components is a component stored on the communication device and is not included in the first portion, a pointer for the component stored on the communication device is included in the first portion, and the pointer points to a location where the component is stored on the communication device, apply security encoding to the first portion, store the first portion in the memory, and configure the processor to enable a content protection mechanism for the component stored on the communication device.

9. The communication device of claim 8 wherein when one of the plurality of components of the message is a component stored on the server, the component stored on the server is not included in the first portion, and a pointer for the component stored on the server is included in the first portion, and the pointer points to a location where the component is stored on the server.

10. The communication device of claim 8 wherein enabling the content protection mechanism comprises:

encrypting the component stored on the communication device with a first encryption key; and including the first encryption key in the first portion;

wherein applying security encoding the first portion includes encrypting the first portion.

11. The communication device of claim 8 wherein one of the plurality of components is a component stored on both the communication device and the server and that component is not included in the first portion, a first pointer and a second pointer are included in the first portion, the first pointer points to a location where the component is stored on the communication device, and the second pointer points to a location where the component is stored on the server.

12. The communication device of claim 8 wherein the processor is configured to apply the security encoding to the first portion by generating a signature for the first portion, and wherein the processor is configured to store the first portion by storing the signature for the first portion.

13. The communication device of claim 8 wherein the processor is configured to apply the security encoding to the first portion by encrypting the first portion to produce an encrypted first portion, and wherein the processor is configured to store the first portion by storing the encrypted first portion.

14. The communication device of claim 8 wherein the plurality of components of the message include components stored on the communication device and components stored on the server, and wherein the computer-executable instructions configure the processor to compile a local composition of the message, the local composition including the components stored on the communication device and pointers to the components stored on the server; and send the local composition to the server.

* * * * *